United States Patent
Sanchez et al.

(10) Patent No.: US 7,458,065 B2
(45) Date of Patent: Nov. 25, 2008

(54) SELECTION OF SPAWNING PAIRS FOR A SPECULATIVE MULTITHREADED PROCESSOR

(75) Inventors: Jesus Sanchez, Barcelona (ES); Carlos Garcia, Barcelona (ES); Carlos Madriles, Barcelona (ES); Peter Rundberg, Gothenburg (SE); Pedro Marcuello, Barcelona (ES); Antonio Gonzalez, Barcelona (ES)

(73) Assignee: Intel Corporation, Santa Clara, CA (US)

( * ) Notice: Subject to any disclaimer, the term of this patent is extended or adjusted under 35 U.S.C. 154(b) by 580 days.

(21) Appl. No.: 10/947,034

(22) Filed: Sep. 21, 2004

(65) Prior Publication Data

US 2006/0064692 A1 Mar. 23, 2006

(51) Int. Cl.
G06F 9/44 (2006.01)
G06F 9/45 (2006.01)

(52) U.S. Cl. ..................... 717/131; 717/140
(58) Field of Classification Search ......... 717/130–133, 717/140, 161
See application file for complete search history.

(56) References Cited

U.S. PATENT DOCUMENTS

| | | | | |
|---|---|---|---|---|
| 6,009,269 A * | 12/1999 | Burrows et al. | ............. | 717/130 |
| 6,247,121 B1 * | 6/2001 | Akkary et al. | ............... | 712/239 |
| 6,317,872 B1 * | 11/2001 | Gee et al. | .................... | 717/152 |
| 6,442,585 B1 * | 8/2002 | Dean et al. | .................. | 718/108 |
| 6,622,300 B1 * | 9/2003 | Krishnaswamy et al. | .... | 717/130 |
| 6,931,631 B2 * | 8/2005 | Bates et al. | .................. | 717/129 |
| 6,957,422 B2 * | 10/2005 | Hunt | ......................... | 717/130 |
| 6,993,750 B2 * | 1/2006 | Hundt et al. | ................ | 717/130 |
| 7,013,456 B1 * | 3/2006 | Van Dyke et al. | ........... | 717/130 |
| 7,069,545 B2 * | 6/2006 | Wang et al. | .................. | 717/131 |
| 7,082,599 B1 * | 7/2006 | Morganelli et al. | ......... | 717/132 |
| 7,185,178 B1 * | 2/2007 | Barreh et al. | ............... | 712/206 |
| 7,240,160 B1 * | 7/2007 | Hetherington et al. | ...... | 711/122 |
| 7,346,902 B2 * | 3/2008 | Dutt et al. | ................... | 717/149 |

OTHER PUBLICATIONS

McLean et al. "Predictable Time Management for Real-Time distributed Simulation", Jun. 2003, IEEE computer Society, pp. 1-8.*

Aamodt et al. "A Framework for Modeling and Optimization of Prescient Instruction Prefetch", Jun. 2003, ACM, ACM SIGMETRICS Performance Evaluation Review, vol. 31 Issue 1, pp. 13-24.*

(Continued)

*Primary Examiner*—Wei Y. Zhen
*Assistant Examiner*—Anna Deng
(74) *Attorney, Agent, or Firm*—Shireen Irani Bacon

(57) ABSTRACT

A method for analyzing a set of spawning pairs, where each spawning pair identifies at least one speculative thread. The analysis may be practiced via software in a compiler, binary optimizer, standalone modeler, or the like. The analysis may include determining a predicted execution time for a sequence of program instructions, given the set of spawning pairs, for a target processor having a known number of thread units, where the target processor supports speculative multithreading. The method is further to select a spawning pair, according to a greedy approach, if the spawning pair provides a performance enhancement, in terms of decreased execution time due to increased parallelism, when the speculative thread is spawned during execution of a code sequence. Other embodiments are also described and claimed.

25 Claims, 10 Drawing Sheets

OTHER PUBLICATIONS

U.S. Appl. No. 10/933,076, filed Sep. 1, 2004, Sanchez et al.

U.S. Appl. No. 10/245,548, filed Sep. 17, 2002, Liao et al.

"Greedy Algorithm", NIST, printed Sep. 9, 2004, http://www.nist.gov/dads/HTML/greedyalgo.html:.

Marcuello P., and Gonzalez A., "Thread-Spawning Schemes for Speculative Multithreading", IEEE, 8th Intl symposium on high-performance computer architecture, 10 pages.

Carlos Madriles, et al., "Multi-version Register File For Multithreading Processors With Live-in Precomputation"; U.S. Appl. No. 10/896,585, filed Jul. 21, 2004.

Jesus Sanchez, et al., "Analyzer For Spawning Pairs In Speculative Multithreaded Processor"; U.S. Appl. No. 10/933,076, filed Sep. 1, 2004.

* cited by examiner

A) Sequential

B) SpMT

US 7,458,065 B2

SELECTION OF SPAWNING PAIRS FOR A SPECULATIVE MULTITHREADED PROCESSOR

BACKGROUND

1. Technical Field

The present disclosure relates generally to information processing systems and, more specifically, to embodiments of a method and apparatus for selecting spawning pairs for speculative multithreading.

2. Background Art

In order to increase performance of information processing systems, such as those that include microprocessors, both hardware and software techniques have been employed. One approach that has been employed to improve processor performance is known as "multithreading." In multithreading, an instruction stream is split into multiple instruction streams that can be executed concurrently. In software-only multithreading approaches, such as time-multiplex multithreading or switch-on-event multithreading, the multiple instruction streams are alternatively executed on the same shared processor.

Increasingly, multithreading is supported in hardware. For instance, in one approach, referred to as simultaneous multithreading ("SMT"), a single physical processor is made to appear as multiple logical processors to operating systems and user programs. Each logical processor maintains a complete set of the architecture state, but nearly all other resources of the physical processor, such as caches, execution units, branch predictors, control logic, and buses are shared. In another approach, processors in a multi-processor system, such as a chip multiprocessor ("CMP") system, may each act on one of the multiple threads concurrently. In the SMT and CMP multithreading approaches, threads execute concurrently and make better use of shared resources than time-multiplex multithreading or switch-on-event multithreading.

For those systems, such as CMP and SMT multithreading systems, that provide hardware support for multiple threads, several independent threads may be executed concurrently. In addition, however, such systems may also be utilized to increase the throughput for single-threaded applications. That is, one or more thread contexts may be idle during execution of a single-threaded application. Utilizing otherwise idle thread contexts to speculatively parallelize the single-threaded application can increase speed of execution and throughput for the single-threaded application.

BRIEF DESCRIPTION OF THE DRAWINGS

The present invention may be understood with reference to the following drawings in which like elements are indicated by like numbers. These drawings are not intended to be limiting but are instead provided to illustrate selected embodiments of a method and apparatus for selecting spawning pairs for a speculative multithreading processor.

DETAILED DISCUSSION

Figure 1:
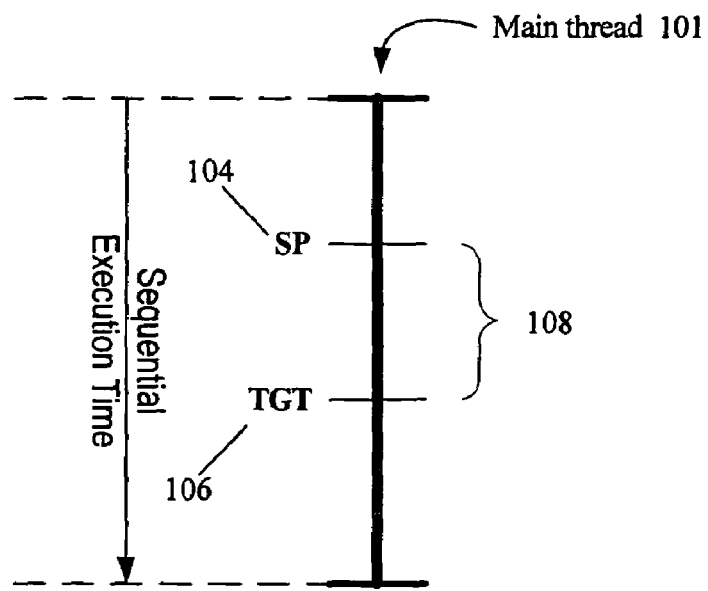
FIG. 1 is a block diagram illustrating sample sequential and multithreaded execution times for a sequence of program instructions.
Figure 1:
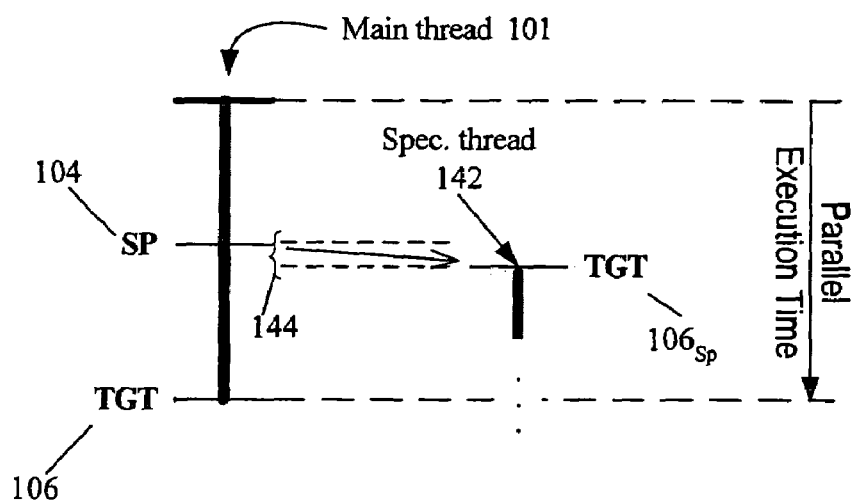

Described herein are selected embodiments of a method, compiler and system for selecting spawning pairs for speculative multithreading. In the following description, numerous specific details such as thread unit architectures (SMT and CMP), SpMT processor architecture, number of thread units, variable names, stages for speculative thread execution, and the like have been set forth to provide a more thorough understanding of the present invention. It will be appreciated, however, by one skilled in the art that the embodiments may be practiced without such specific details. Additionally, some well-known structures, circuits, and the like have not been shown in detail to avoid unnecessarily obscuring the embodiments discussed herein.

As used herein, the term "thread" is intended to refer to a sequence of one or more instructions. For the multithreading system embodiments described herein, the instructions of a thread may be executed by a thread unit of a processor, concurrently with one or more other threads executed by other thread units of the processor. For at least one embodiment, the thread units may be separate logical processors in a single processor core, such as an SMT processor core. Alternatively, each thread unit may be a separate processor core in a single chip package. For CMP embodiments, such as the embodiments 300, 700 illustrated in FIGS. 3 and 7, respectively, each processor core 304, referred to as a "thread unit," may execute a separate thread.

For purposes of the discussion herein, it is assumed that the target processor for the disclosed method embodiments includes a plurality of thread units, and that each thread unit is equipped with hardware to support the spawning, validating, squashing and committing of speculative threads. Such processors are referred to herein as Speculative Multithreading (SpMT) processors. As is discussed above, for at least one embodiment, the thread units for an SpMT processor are separate processor cores in a CMP embodiment (see FIGS. 3 and 7). For at least one other embodiment, the thread units are separate logical processors in a single processor core.

The method embodiments for analyzing and selecting spawning pairs, discussed herein, may thus be utilized for an SpMT processor that supports speculative multithreading. For at least one speculative multithreading approach, the execution time for a single-threaded application is reduced through the execution of one or more concurrent speculative threads. One approach for speculatively spawning additional threads to improve throughput for single-threaded code is discussed in commonly-assigned U.S. patent application Ser. No. 10/356,435, "Control-Quasi-Independent-Points Guided Speculative Multithreading". Under such approach, single-threaded code is partitioned into threads that may be executed concurrently.

For at least one embodiment, a portion of an application's code (referred to herein as a code sequence) may be parallelized through the use of the concurrent speculative threads. A speculative thread, referred to as the spawnee thread, is spawned at a spawn point in response to a spawn instruction, such as a fork instruction. The thread that performed the spawn is referred to as the spawner thread.

The spawned thread executes instructions that are ahead, in sequential program order, of the code being executed by the thread that performed the spawn. The address at which the spawned thread is to begin execution (the "target" address) may be specified in the spawn instruction. For at least one embodiment, a thread unit (such as an SMT logical processor or a CMP core), separate from the thread unit executing the spawner thread, executes the spawnee thread. One skilled in the art will recognize that the embodiments discussed herein may be utilized for any multithreading approach, including SMT, CMP multithreading or other multiprocessor multithreading, or any other known multithreading approach that may encounter idle thread contexts.

A spawnee thread is thus associated, via a spawn instruction, with a spawn point in the spawner thread as well as with a point at which the spawnee thread should begin execution. The latter is referred to as a target point. (For at least one embodiment, the target point address may be identified as the beginning address for particular basic block). These two points together are referred to as a "spawning pair." A potential speculative thread is thus defined by a spawning pair, which includes a spawn point in the static program where a new thread is to be spawned and a target point further along in the program where the speculative thread will begin execution when it is spawned. It should be noted that, for certain situations, such as when a spawning pair indicates a portion of code within a loop, that a spawning pair may indicate more than one instance of the speculative thread.

Well-chosen spawning pairs can generate speculative threads that provide significant performance enhancement for otherwise single-threaded code. FIG. 1 graphically illustrates such performance enhancement, in a general sense. FIG. 1 illustrates, at 102, sequential execution time for a single-threaded instruction stream, referred to as main thread 101. For single-threaded sequential execution, it takes a certain amount of execution time, 108, between execution of a spawn point 104 and execution of the instruction at a selected future execution point 106 at which a spawned thread, if spawned at the spawn point 104, would begin execution. As is discussed above, the future execution point 106 may be referred to herein as the "target point." For at least one embodiment, the target point may be a control-quasi-independent point ("CQIP"). A CQIP is a target point that, given a particular spawn point, has at least a threshold probability that it will be reached during execution.

FIG. 1 illustrates, at 140, that a speculative thread 142 may be spawned at the spawn point 104. A spawn instruction at the spawn point 104 may effect spawning of a spawnee thread 142, which is to execute concurrently with the spawner thread 101. Such spawn instruction may be similar to known spawn and fork instructions, which indicate the target address at which the spawnee thread is to begin execution.

For purposes of example, the notation $106_{Sp}$ refers to the target point instruction executed by the speculative thread 142 while the main thread 101 continues execution after the spawn point 104. If such speculative thread 142 begins concurrent execution at the target point $106_{Sp}$, while the main thread 101 continues single-threaded execution of the instructions after the spawn point 104 (but before the target point 106), then execution time between the spawn point 104 and the target point 106 may be decreased to the time between the spawn point 104 and the speculative thread's 142 execution of the target point $106_{SP}$ (see 144).

That is not to say that the spawned speculative thread 142 necessarily begins execution at the target point $106_{Sp}$ immediately after the speculative thread 142 has been spawned. Indeed, for at least one embodiment, certain initialization and data dependence processing may occur before the spawned speculative thread 142 begins execution at the target point 106. Such processing is represented in FIG. 1 as overhead 144.

Figure 2:
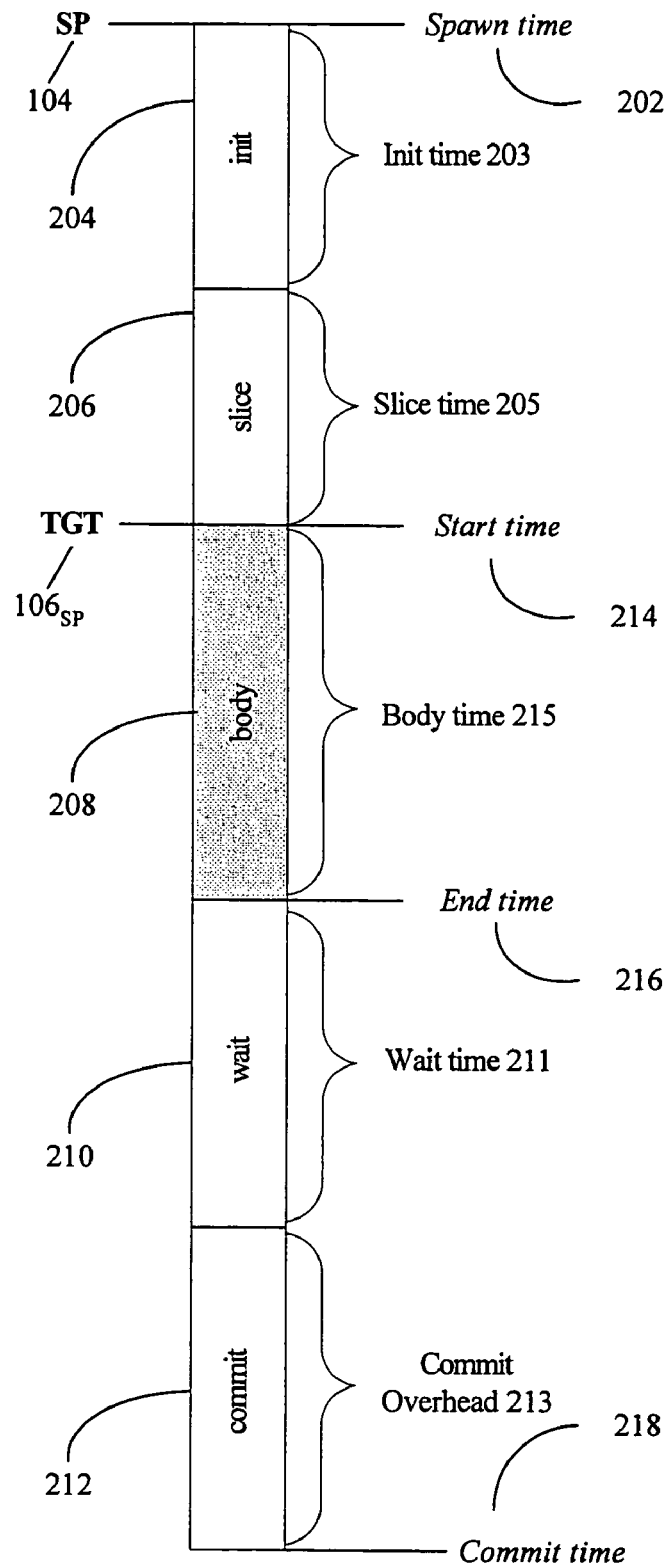
FIG. 2 is a block diagram illustrating at least one embodiment of the stages of a speculative thread.

Generally, the discussion of FIG. 2, below, indicates that such overhead 144 may include initialization time 203 and slice time 205 as illustrated in FIG. 2. However, such overhead 144 associated with the spawning of a speculative thread may be assumed, for at least some embodiments of modeling of execution time described herein, to be a constant value (such as zero). Such assumption may be implemented, for instance, by an execution time modeler (855, FIG. 8) when modeling execution time for blocks 406, 506 and 604, respectively, of FIGS. 4, 5, and 6.

FIG. 2 is a block diagram illustrating stages, for at least one embodiment, in the lifetime of a spawned speculative thread (such as, for example, speculative thread 142, FIG. 1). FIG. 2 is discussed herein in connection with FIG. 1.

FIGS. 1 and 2 illustrate that, at a spawn time 202, the speculative thread is spawned in response to a spawn instruction at the spawn point 104 in the main thread 101 instruction stream. Thereafter, initialization processing may occur during an initialization ("init") stage 204. Such initialization processing may include, for instance, copying input register values from the main thread context to the registers to be utilized by the speculative thread. Such input values may be utilized, for example, when pre-computing live-in values (discussed further below).

The time it takes to execute the initialization processing 204 for a speculative thread is referred to herein as Init time 203. Init time 203 represents the overhead to create a new thread. For at least one embodiment of the methods for modeling execution time discussed herein, the overhead 144 (FIG. 1) discussed in FIG. 1 may thus include Init time 203. For at least one embodiment of the methods discussed herein, Init time 203 may be assumed to be a fixed value for all speculative threads.

After the initialization stage 204, an optional slice stage 206 may occur. During the slice stage 206, live-in input values, upon which the speculative thread 142 is anticipated to depend, may be calculated. For at least one embodiment, live-in values are computed via execution of a "precomputation slice" during the slice stage 206. When a precomputation slice is executed, live-in values for a speculative thread are pre-computed using speculative precomputation based on backward dependency analysis. The slice stage 206 is optional in the sense that every speculative thread need not necessarily include a precomputation slice.

For at least one embodiment, the precomputation slice is executed, in order to pre-compute the live-in values for the speculative thread, before the main body of the speculative thread instructions is executed. This is illustrated in FIG. 2, which shows that the slice stage 206 is completed before execution of the body stage 208 begins at the target point $106_{SP}$. Accordingly, overhead 144 may also include a slice time 205, which is associated with execution at stage 206 of a precomputation slice.

The precomputation slice may be a subset of instructions from one or more previous threads, which is generated for the speculative thread based on backward dependency analysis. A "previous thread" may include the main non-speculative thread, as well as any other "earlier" (according to sequential program order) speculative thread. The subset of instructions for a precomputation slice may be copied from the input code sequence (see 416, FIG. 4) for the main thread 101.

In order to facilitate execution of a precomputation slice before execution of the thread body for a speculative thread, the target address indicated by a spawn instruction may be the beginning address of a sequence of precomputation slice instructions ("the precomputation slice"). The precomputation slice may be added to binary instructions associated with the input code sequence (see 416, FIG. 4) to create a binary file (see 420, FIG. 4). The precomputation slice may be added, for various embodiments, at different locations within the binary file. 420 For at least one embodiment, the last instruction in a precomputation slice is an instruction that effects a branch to the target point 106.

Live-in calculations performed during the slice stage 206 may be particularly useful if the target processor for the speculative thread does not support synchronization among threads in order to correctly handle data dependencies. Details for at least one embodiment of a target processor is discussed in further detail below in connection with FIG. 3.

Figure 9:
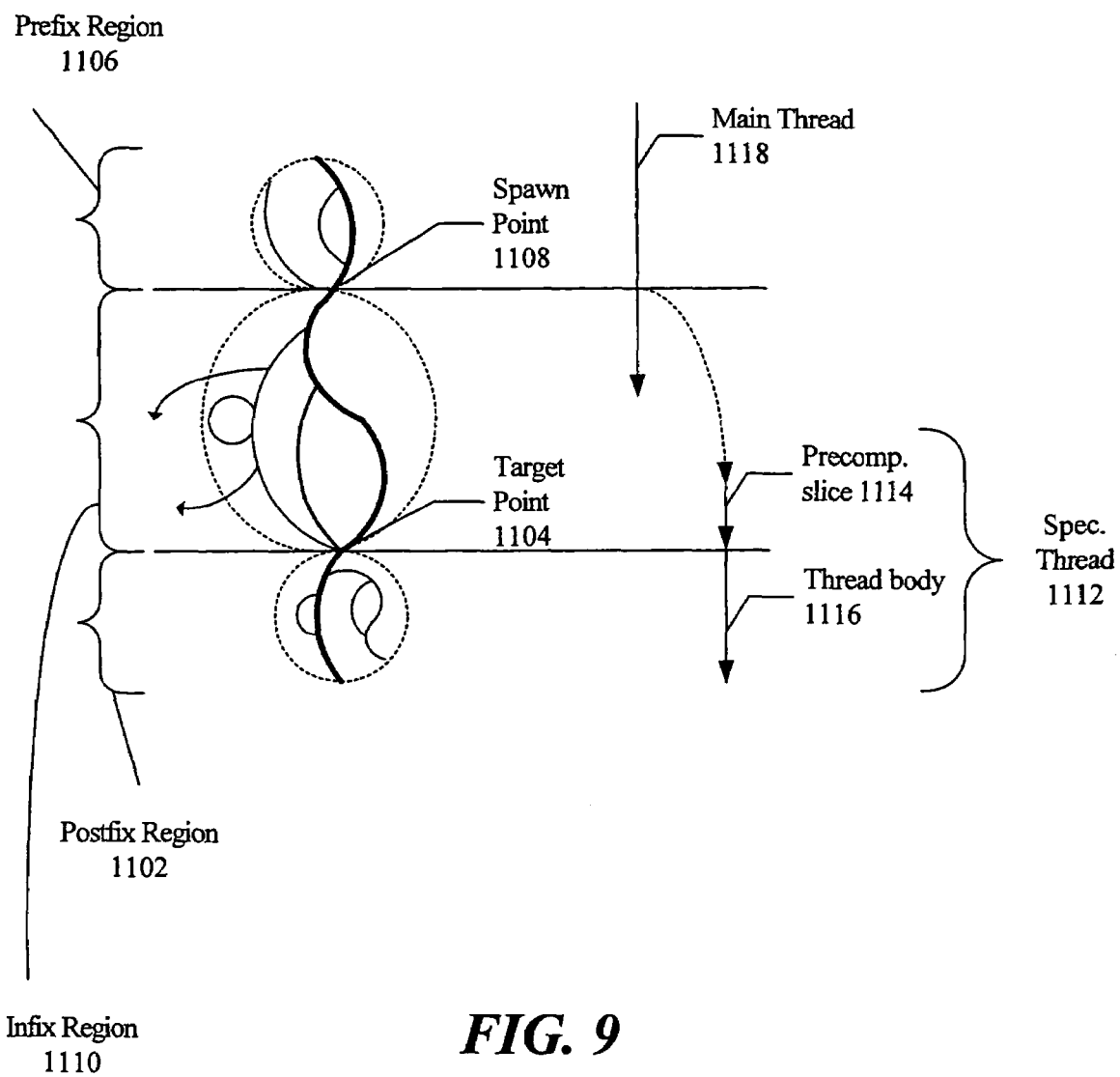
FIG. 9 is a control flow diagram representing an illustrative main thread program fragment containing three distinct control-flow regions.

Brief reference is made to FIG. 9 for a further discussion of precomputation slices. FIG. 9 is a control flow diagram representing an illustrative main thread 1118 program fragment containing three distinct control-flow regions. In the illustrated example, a postfix region 1102 following a target point 1104 can be identified as a program segment appropriate for execution by a speculative thread. A spawn point 1108 is the point in the main thread program at which the speculative thread 1112 will be spawned. The target point 1104 is the point at which the spawned speculative thread will begin execution of the main thread instructions. For simplicity of explanation, a region 1106 before a spawn point 1108 is called the prefix region 1106, and a region 1110 between the spawn point 1108 and target point 1104 is called the infix region 1110.

A speculative thread 1112 may include two portions. Specifically, the speculative thread 1112 may include a precomputation slice 1114 and a thread body 1116. During execution of the precomputation slice 1114, the speculative thread 1112 determines one or more live-in values in the infix region 1110 before starting to execute the thread body 1116 in the postfix region 1102. The instructions executed by the speculative thread 1112 during execution of the precomputation slice 1114 correspond to a subset (referred to as a "backward slice") of instructions from the main thread in the infix region 1110 that fall between the spawn point 1108 and the target point 1104. This subset may include instructions to calculate data values upon which instructions in the postfix region 1102 depend. For at least one embodiment of the methods described herein, the time that it takes to execute a slice is referred to as slice time 205.

During execution of the thread body 1116, the speculative thread 1112 executes code from the postfix region 1102, which may be an intact portion of the main thread's original code.

Returning to FIG. 2, which is further discussed with reference to FIG. 11, one can see that, after the precomputation slice stage 206 has been executed, the speculative thread begins execution of its thread body 1116 during a body stage 208. The beginning of the body stage 208 is referred to herein as the thread start time 214. The start time 214 reflects the time at which the speculative thread reaches the target point $106_{SP}$ and begins execution of the thread body 1116. The start time 214 for a speculative thread may be calculated as the cumulation of the spawn time 202, init time 203, and slice time 205. The latter represents the time it takes to execute the speculative thread's 1112 precomputation slice 1114.

The time from the beginning of the first basic block of the thread body to the end of the last basic block of the thread body (i.e., to the beginning of the first basic block of the next thread) corresponds to the body time 215. The body time 215 represents the time it takes to execute the speculative thread's 1112 thread body 1116.

After the speculative thread has completed execution of its thread body 1116 during the body stage 208, the thread enters a wait stage 210. The time at which the thread has completed execution of the instructions of its thread body 1116 may be referred to as the end time 216. For at least one embodiment, end time 216 may be calculated as the cumulation of the start time 214 and the body time 215.

The wait stage 210 represents the time that the speculative thread 1112 must wait until it becomes the least speculative thread. The wait stage 210 reflects assumption of an execution model in which speculative threads commit their results according to sequential program order. At this point, a discussion of an example embodiment of a target SpMT processor may be helpful in understanding the processing of the wait stage 210.

Figure 3:
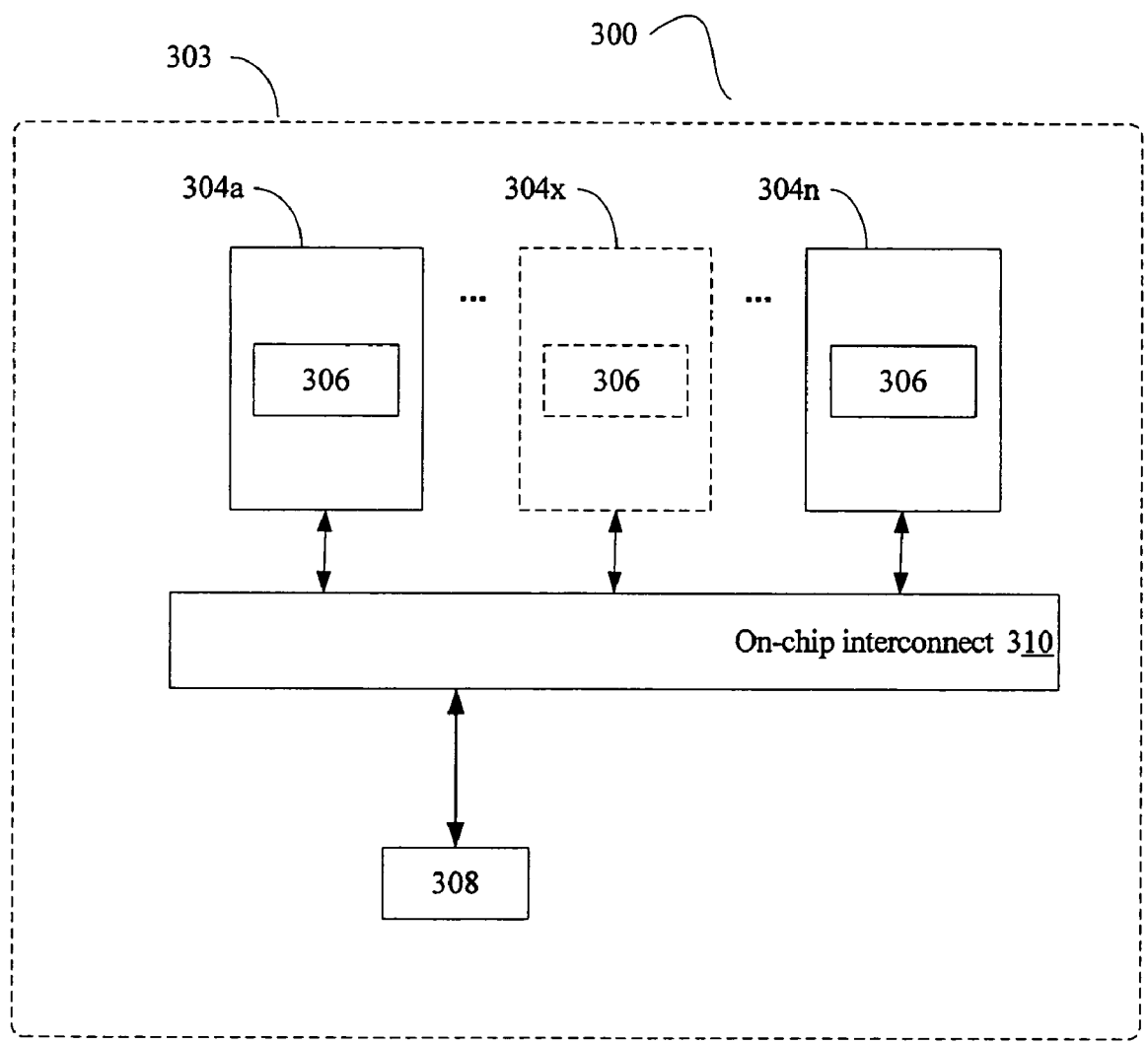
FIG. 3 is a block diagram illustrating at least one embodiment of a processor capable of performing speculative multithreading (SpMT).

Reference is now made to FIG. 3, which is a block diagram illustrating at least one embodiment of a multithreaded processor 300 capable of executing speculative threads to speed the execution of single-threaded code. The processor 300 includes two or more thread units 304a-304n. For purposes of discussion, the number of thread units is referred to as "N." The optional nature of thread units 304 in excess of two such thread units (such as thread unit 304x) is denoted by dotted lines and ellipses in FIG. 3. That is, FIG. 3 illustrates N≧2.

For embodiments of the selection methods discussed herein (such as, for example, method 400 illustrated in FIG. 4), it is assumed that the target SpMT processor 300 includes a fixed, known number of thread units 304. As is discussed in further detail below, it is also assumed that, during execution of an otherwise single-threaded program on the SpMT processor 300, there is only one non-speculative thread running at any given time, and that the non-speculative thread is the only thread that is permitted to commit its results to the architectural state of the processor 300. During execution, all other threads are speculative.

For at least one embodiment, such as that illustrated in FIG. 3, each of the thread units 304 is a processor core, with the multiple cores 304a-304n residing in a single chip package 303. Each core 304 may be either a single-threaded or multi-threaded processor. For at least one alternative embodiment, the processor 300 is a single-core processor that supports concurrent multithreading. For such embodiment, each thread unit 304 is a logical processor having its own instruction sequencer, although the same processor core executes all thread instructions. For such embodiment, the logical processor maintains its own version of the architecture state, although execution resources of the single processor core may be shared among concurrent threads.

While the CMP embodiments of processor 300 discussed herein refer to only a single thread per processor core 304, it should not be assumed that the disclosures herein are limited to single-threaded processors. The techniques discussed herein may be employed in any CMP system, including those that include multiple multi-threaded processor cores in a single chip package 303.

The thread units 304a-304n may communicate with each other via an interconnection network such as on-chip interconnect 310. Such interconnect 310 may allow register communication among the threads. In addition, FIG. 3 illustrates that each thread unit 304 may communicate with other components of the processor 300 via the interconnect 310.

The topology of the interconnect 310 may be a multi-drop bus, a point-to-point network that directly connects each thread unit 304 to each other, or the like. In other words, any interconnection approach may be utilized. For instance, one of skill in the art will recognize that, for at least one alternative embodiment, the interconnect 310 may be based on a ring topology.

According to an execution model that is assumed for at least one embodiment of method 400 (FIG. 4), any speculative thread is permitted to spawn one or more other speculative threads. Because any thread can spawn a new thread, the threads can start in any order. The speculative threads are considered "speculative" at least for the reason that they may be data and/or control dependent on previous (according to sequential program order) threads.

For at least one embodiment of the execution model assumed for an SpMT processor, the requirements to spawn a thread are: 1) there is a free thread unit 304 available, OR 2) there is at least one running thread that is more speculative than the thread to be spawned. That is, for the second condition, there is an active thread that is further away in sequential time from the "target point" for the speculative thread that is to be spawned. In this second case, the method 400 assumes an execution model in which the most speculative thread is squashed, and its freed thread unit is assigned to the new thread that is to be spawned.

Among the running threads, at least one embodiment of the assumed execution model only allows one thread (referred to as the "main" thread) to be non-speculative. When all previously-spawned threads have either completed execution or been squashed, then the next speculative thread becomes the non-speculative main thread. Accordingly, over time the current non-speculative "main" thread may alternatively execute on different thread units.

Each thread becomes non-speculative and commits in a sequential order. A thread finished when it reaches the beginning address (the "target" address) of another thread that is active. A speculative thread must wait (see wait stage 210, FIG. 2) to become the oldest thread (i.e., the non-speculative thread), to commit its values. Accordingly, there is a sequential order among the running threads. For normal execution, a thread completes execution when it reaches the start of another active thread. However, a speculative thread may be squashed if it violates sequential correctness of the single-threaded program.

As is stated above, speculative threads can speed the execution of otherwise sequential software code. As each thread is executed on a thread unit 304, the thread unit 304 updates and/or reads the values of architectural registers. The thread unit's register values are not committed to the architectural state of the processor 300 until the thread being executed by the thread unit 304 becomes the non-speculative thread. Accordingly, each thread unit 304 may include a local register file 306. In addition, processor 300 may include a global register file 308, which can store the committed architectural value for each of R architectural registers. Additional details regarding at least one embodiment of a processor that provides local register files 306 for each thread unit 304 may be found in co-pending patent application U.S. patent application Ser. No. 10/896,585, filed Jul. 21, 2004, and entitled "Multi-Version Register File For Multithreading Processors With Live-In Precomputation".

Returning to FIG. 2, the wait stage 210 reflects the time, after the speculative thread completes execution of its thread body 1116, that the speculative thread waits to become non-speculative. When the wait stage 210 is complete, the speculative thread has become non-speculative. Duration of the wait stage 210 is referred to as wait time 211.

The speculative thread may then enter the commit stage 212 and the local register values for the thread unit 304 (FIG. 3) may be committed to the architectural state of the processor 300 (FIG. 3). The duration of the commit stage 212 reflects the overhead associated with terminating a thread. This overhead is referred to as commit overhead 213. For at least one embodiment, commit overhead 213 may be a fixed value.

The commit time 218 illustrated in FIG. 2 represents time at which the speculative thread has completed the commission of its values. In a sense, the commit time may reflect total execution time for the speculative thread. The commit time for a thread that completes normal execution may be calculated as the cumulation of the end time 216, wait time 211, and commit overhead 213.

The effectiveness of a spawning pair may depend on the control flow between the spawn point and the start of the speculative thread, as well as on the control after the start of the speculative thread, the aggressiveness of the compiler in generating the p-slice that precomputes the speculative thread's input values (discussed in further detail below), and the number of hardware contexts available to execute speculative threads. Determination of the true execution speedup due to speculative multithreading should take the interaction between various instances of the thread into account. Thus, the determination of how effective a potential speculative thread will be can be quite complex.

Figure 4:
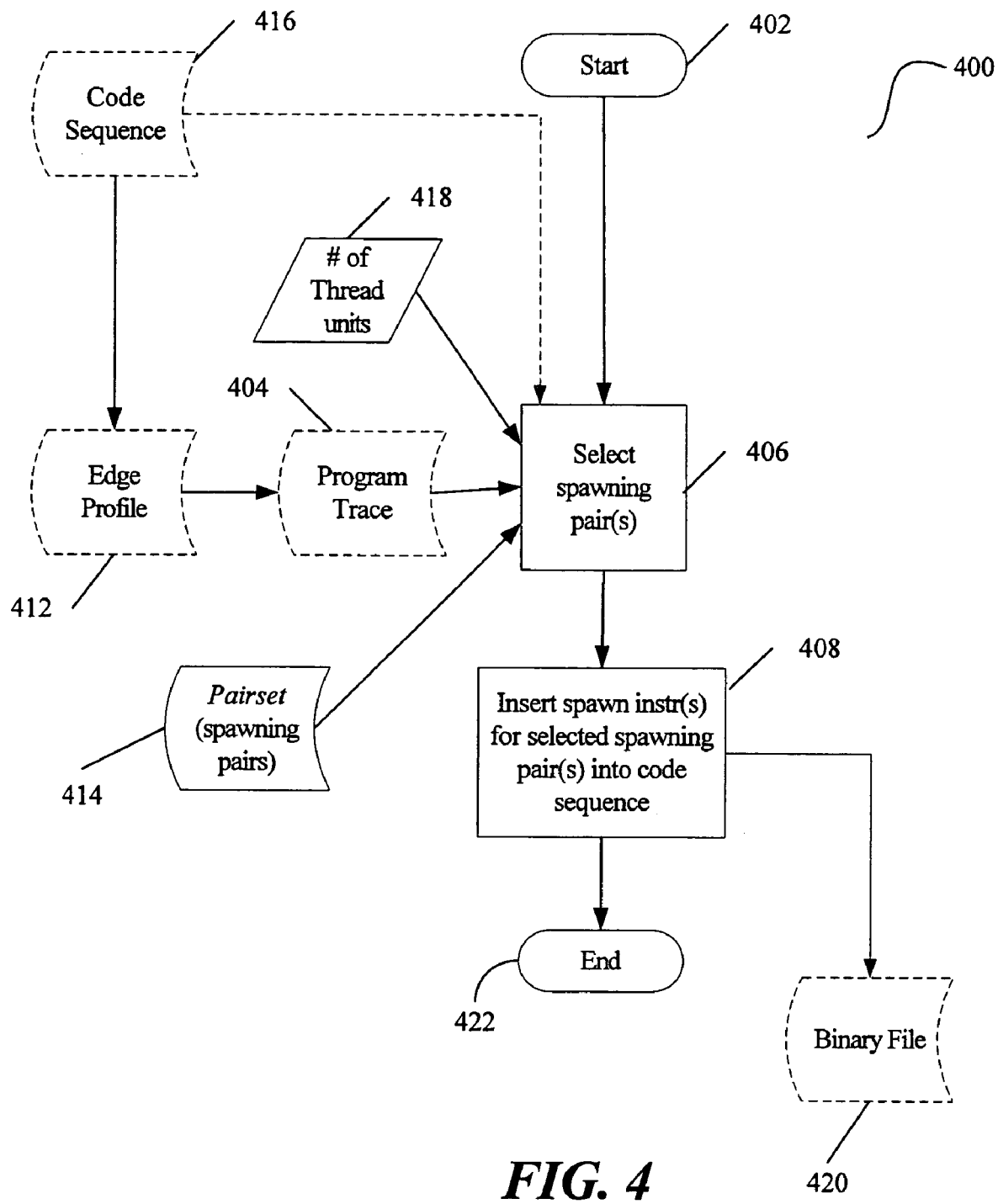
FIG. 4 is a flowchart illustrating at least one embodiment of a method for modifying a sequence of program instructions to include a spawn instruction for at least one concurrent speculative thread.

FIG. 4 is a flowchart illustrating a method 400 for analyzing the effects of a set of spawning pairs on the modeled execution time for a given sequence of program instructions, and for selecting one or more of the spawning pairs if the spawning pair(s) are determined to decrease the modeled execution time. Spawn instructions for the selected spawning pairs are added to a binary file for the given program sequence.

Figure 7:
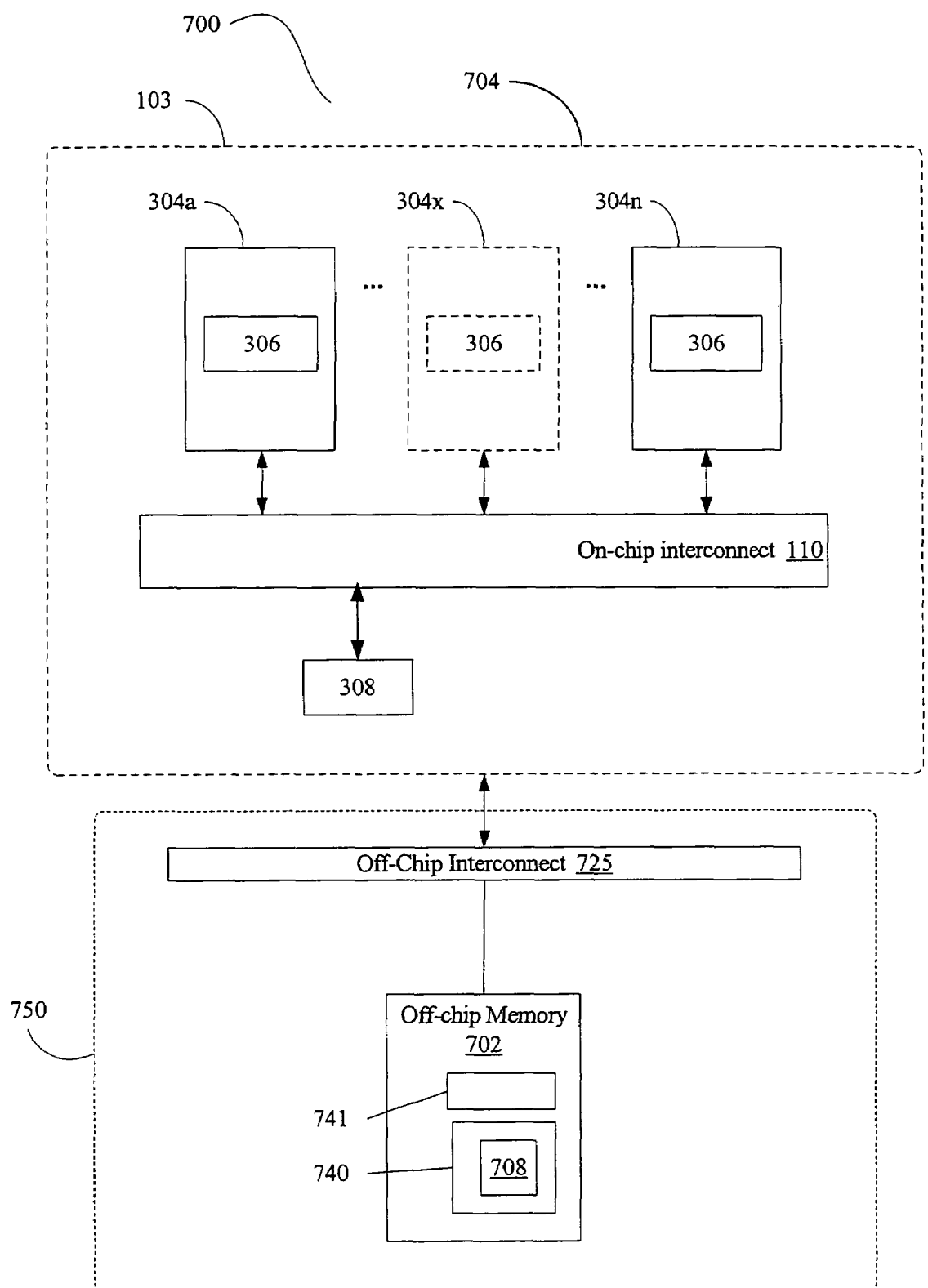
FIG. 7 is a block diagram of at least one embodiment of an SpMT processing system capable of performing disclosed techniques.
Figure 8:
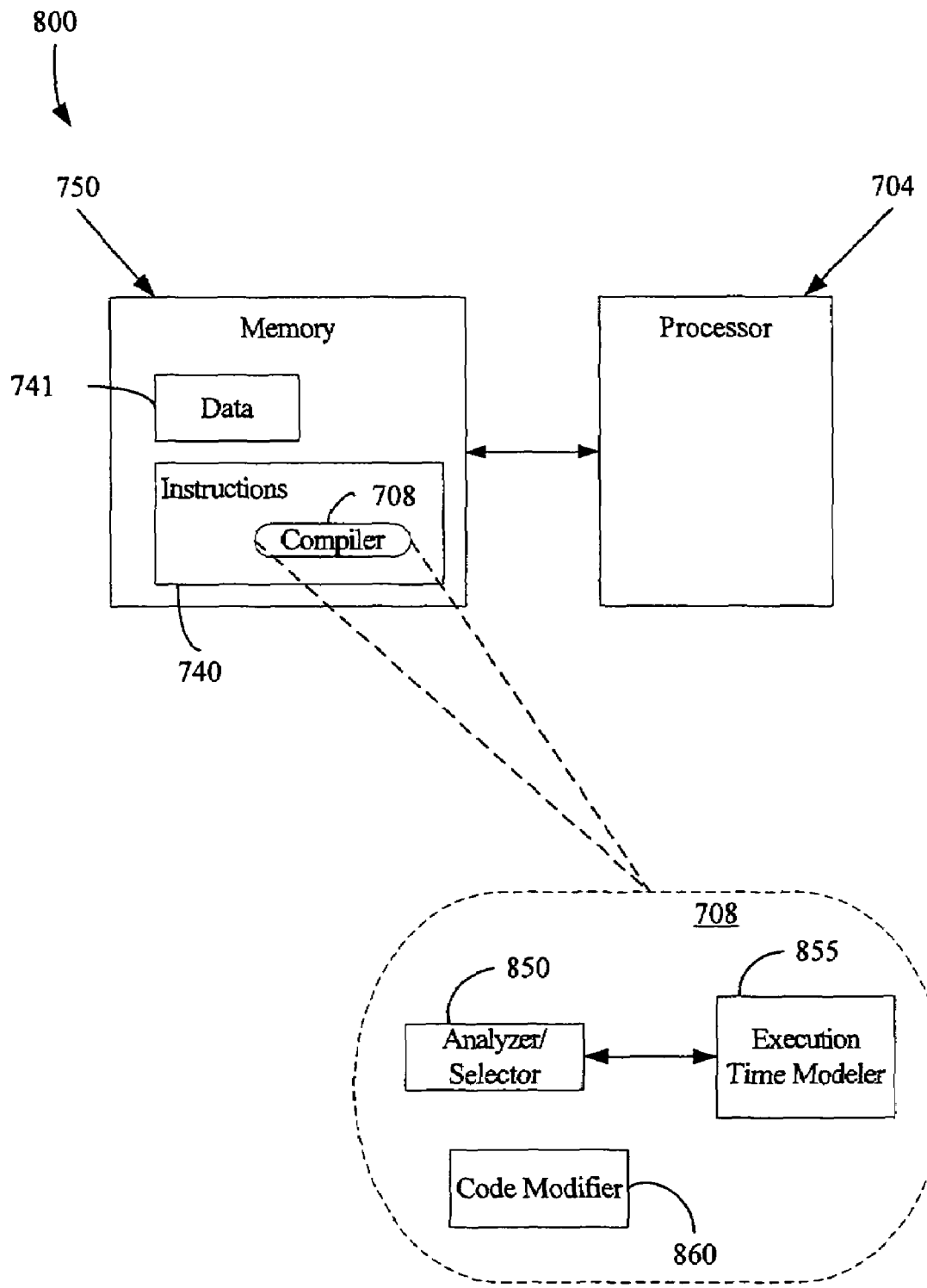
FIG. 8 is a block diagram illustrating a compiler and system capable of performing disclosed techniques.
Figure 10:
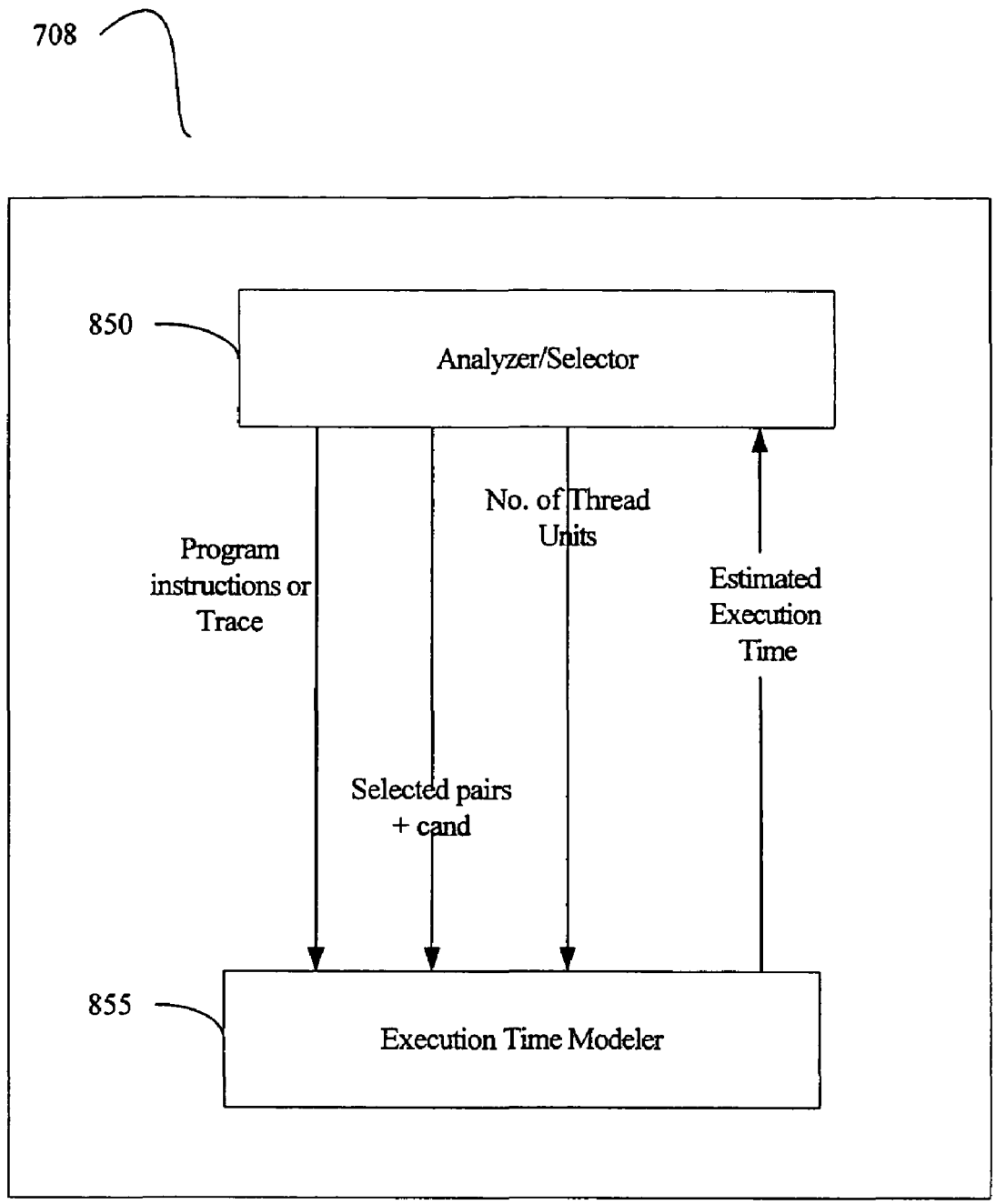
FIG. 10 is a block data flow diagram illustrating data flow within a compiler capable of performing disclosed techniques.

For at least one embodiment, the method 400 may be performed by a compiler (such as, for example, compiler 708 illustrated in FIGS. 7, 8, and 10). The compiler 708 may be an optimizing compiler. For such embodiment, the compiler 708 may perform the method 400 during a code generation phase, after optimizations have been performed.

For at least one alternative embodiment, the method 400 may be embodied in any other type of software, hardware, or firmware product, including a standalone product that selects spawning points. The method 400 may be performed in connection with a sequence of program instructions to be run on a processor that supports speculative multithreading (such as, for example, SpMT processor 300 illustrated in FIG. 3).

For at least one embodiment, the method 400 may be performed by a compiler 708 to analyze, at compile time, the expected benefits of a set of spawning pairs for a given sequence of program instructions. Generally, the method 400 models execution of the program instructions as they would be performed on the target SpMT processor, taking into account the behavior induced by the specified set of spawning pairs. The method 400 determines whether speculative thread(s) indicated by a spawning pair will improve the expected execution time for the given code sequence. If so, the method 400 selects the spawning pair and inserts an appropriate spawn instruction into the code sequence to facilitate spawning of the speculative thread(s) when the modified code sequence is executed. The method 400 thus may be utilized in order to speed the execution of an otherwise single-threaded code sequence on an SpMT processor.

Rather than a simple heuristic approach, at least one embodiment of the method 400 provides a more thorough analysis of the code sequence (via profiling information) and candidate spawning pairs in order to estimate the benefit of any set of candidate spawning pairs and to select effective spawning pairs. The analysis provided by the method 400 takes into account inter-thread dependences for speculative threads indicated by a set of spawn points.

FIG. 4 illustrates that inputs to the method 400 may include the number of thread units 418 included in the target SpMT processor. The method 400 may also receive as inputs a set of candidate spawning pairs (referred to herein as a pairset) 414 and a representation of a sequence of program instructions. For at least one embodiment, such representation is a program trace 404.

For at least one embodiment, the pairset 414 includes one or more spawning pairs, with each spawning pair representing at least one potential speculative thread. (Of course, a given spawning pair may represent several speculative threads if, for instance, it is enclosed in a loop). A given spawning pair in the pairset 414 may include the following information: SP (spawn point) and TGT (target point). The SP indicates, for the speculative thread that is indicated by the spawning pair, the static basic block of the main thread program that fires the spawning of a speculative thread when executed. The TGT indicates, for the speculative thread indicated by the spawning pair, the static basic block that represents the starting point, in the main thread's sequential binary code, of the speculative thread associated with the SP. The SP and TGT may be in any combination of basic blocks associated with the input code sequence.

In addition, each spawning pair in the pairset 414 may also include precomputation slice information for the indicated speculative thread. The precomputation slice information provided for a spawning pair may include the following information. First, an estimated probability that the speculative thread, when executing the precomputation slice, will reach the TGT point (referred to as a start slice condition), and the average length of the p-slice in such cases. Second, an estimated probability that the speculative thread, when executing the p-slice, does not reach the TGT point (referred to as a cancel slice condition), and the average length of the p-slice in such cases. (For further discussion of how such information may be utilized, see the following discussion of filter conditions in connection with block 504 of FIG. 5)

Regarding the third input, the representation of a sequence of program instructions, such input may be provided in any of several manners. For at least one embodiment, the sequence of program instructions provided as an input to the method 400 may be a subset of the instructions for a program, such as a section of code (a loop, for example) or a routine. Alternatively, the sequence of instructions may be a full program. For either of such embodiments, the input is reflected as the dotted line in FIG. 4 between the code sequence 416 and block 406 of the method 400.

For at least one other embodiment, rather than receiving the actual sequence of program instructions as an input, the method 400 may receive instead a program trace 404 that corresponds to the sequence of program instructions. The program trace 404 is optional, and is not needed if the input to the method 400 is a sequence of instructions 416. Similarly, the original code sequence 416 is optional, and is not needed if the program trace 404 is received by the method 400 as an input. Accordingly, the code sequence 416 and the program trace 404, as well as the edge profile 412 (discussed below) that may be utilized to generate the program trace 404, are all denoted with dotted lines in FIG. 4.

A program trace is a sequence of basic blocks that represents the dynamic execution of the given sequence of code. For at least one embodiment, the program trace that is provided as an input to the method 400 may be the full execution trace for the selected sequence of program instructions. For other embodiments, the program trace 404 that is provided as an input to the method 400 may be a subset of the full program trace for the target instructions. For example, via sampling techniques a subset of the full program trace may be chosen as an input, with the subset being representative of the whole program trace.

For at least one embodiment, the trace 404 may be generated for the code sequence 416 for the input instructions based upon profile information that has been generated for the binary sequence 416 during a previous pass of a compiler or other profile-information generator. For at least one embodiment, such profile information includes an edge profile 412. The edge profile 412 may include the probability of going from any basic block of the input program sequence to each of its successors. The edge profile 412 may also include the execution count for each basic block of the input program sequence.

For at least one embodiment, it is assumed that the length (number of instructions) for each basic block in the trace 404 is known, as well as the accumulated length for each basic block represented in the trace 404. It is further assumed that each instruction requires the same fixed amount of time for execution; therefore the length and accumulated length values for the basic blocks in the trace 404 may be understood to represent time values. Accordingly, the accumulated length of the last basic block in the trace may represent the total executed number of sequential instructions of the input program sequence. Of course, for other embodiments, the time needed to execute each basic block, as well as accumulated time, may be determined by other methods, such as profiling.

FIG. 4 illustrates that processing for at least one embodiment of the method 400 begins at block 402 and proceeds to block 406. At block 406, the effects of a set of spawning pairs on the modeled execution time for a given sequence of program instructions is modeled, and one or more spawning pairs are selected, if such spawning pairs are determined to decrease the modeled execution time. For at least one embodiment, a greedy approach is utilized to select spawning pairs at block 406. Of course, one of skill in the art will recognize that approaches other than a greedy approach may be utilized to select spawning pairs for other embodiments of block 406.

As is known in the art, a greedy algorithm takes the best immediate, or local, solution while finding an answer. Greedy algorithms find the overall, or globally, optimal solution for some optimization problems, but may find less-than-optimal solutions for some instances of other problems. At block 406, utilization of a greedy approach does not necessarily provide the optimal solution. For each iteration, block 406 selects that spawning pair (if any) that, when added to the existing "selected" pairs, yields the greatest additional benefit. Such decision is considered to be local because the approach does not necessarily consider all possible combinations of remaining pairs in the pairset. Further details regarding greedy algorithms are presented in G. Bassard & P. Bratley, *Fundamentals of Algorithms* (Prentice Hall—1996), Chapter 6.

As a result of the operation of block 406, the method may select one or more spawning pairs that are predicted to speed the execution of the input sequence of program instructions. Processing then proceeds from block 406 to block 408.

At block 408, processing is performed to include the spawning pairs (if any) that were selected at block 406 into a binary file 420. Such processing 408 includes placing into the binary file 420 for the input sequence of program instructions a spawn instruction at the spawn point for each spawning pair that was selected at block 406. Such spawn instructions may indicate that the spawnee thread should begin execution at the target point indicated by the respective spawning point, such that, when executed, a speculative thread will be spawned at the spawn point and begin execution at the target point.

Alternatively, for one or more of the selected spawning pairs (if any), input values ("live-ins") may need to be computed for the speculative thread to be spawned. This is particularly true for embodiments of a target SpMT processor that does not synchronize in order to correctly handle data dependences among threads. In such case, the spawn instruction that is inserted into the binary file 420 at block 408 may indicate that the spawnee thread should begin execution at a precomputation slice associated with the speculative thread to be spawned.

For at least one embodiment, such precomputation slice may be appended to the end of the binary file 420 at block 408. Alternatively, the precomputation slice may be placed at the end of the routine indicated by the spawn point of the selected spawning pair. At the end of the precomputation slice, the last instruction of the slice may effect a branch to the target point indicated in the associated spawning point. In this manner, live-in values for the speculative spawnee thread may be generated before the spawnee thread begins execution at the specified target point. Further discussion of the modification of a binary file to include a precomputation slice is set forth in co-pending patent application U.S. patent application Ser. No. 10/245,548, filed Sep. 17, 2002, and entitled "Post-Pass Binary Adaptation For Software-Based Speculative Precomputation".

From block 408, processing for the method 400 ends at block 422.

Figure 5:
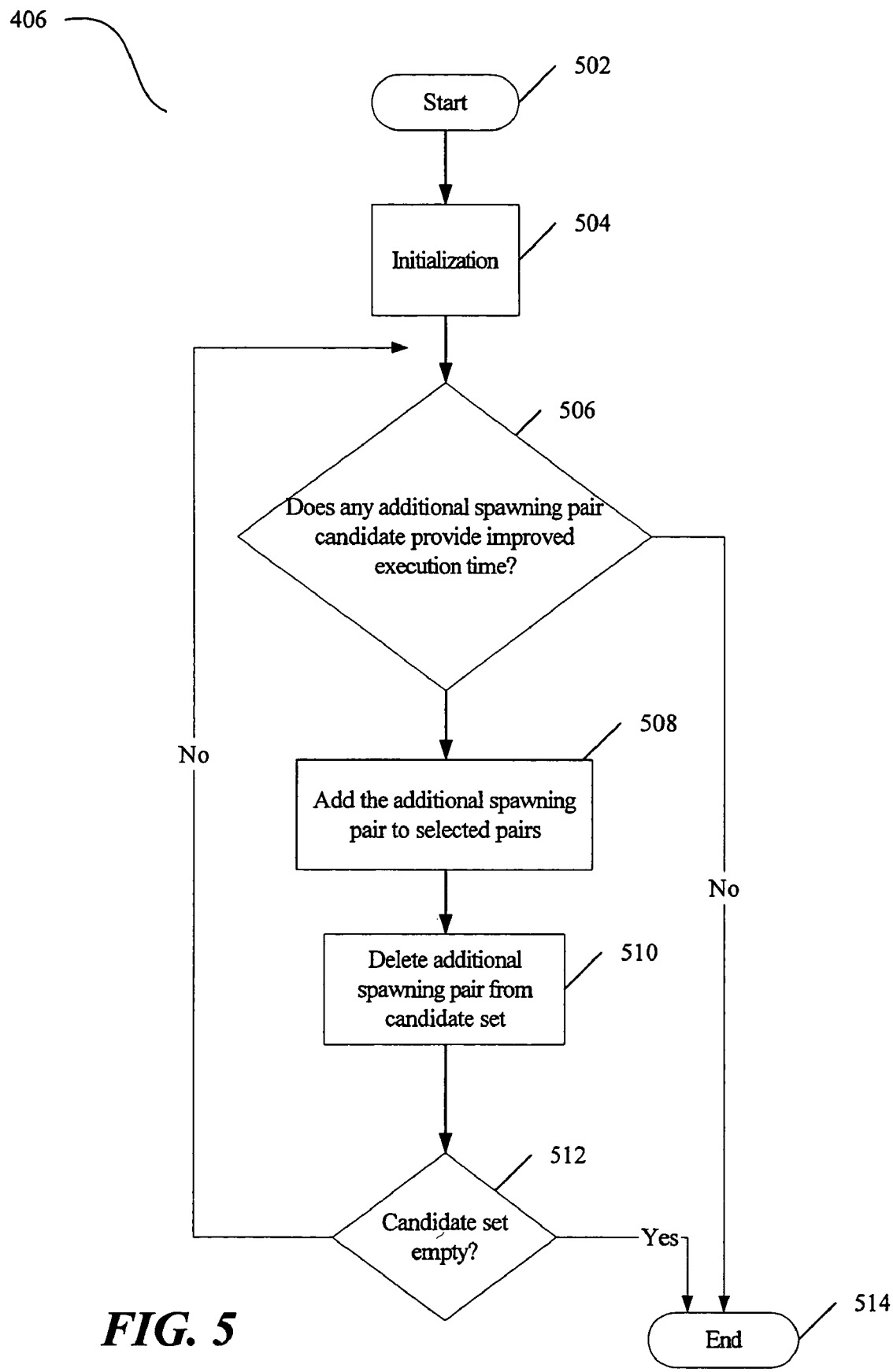
FIG. 5 is a flowchart illustrating at least one embodiment of a method for analyzing at least one spawning pair candidate and utilizing a greedy algorithm to determine whether to select any of the candidate(s).

FIG. 5 is a flowchart illustrating at least one embodiment of a method 406 for analyzing at least one spawning pair candidate and utilizing a greedy algorithm to determine whether to select any of the candidate(s). FIG. 5 is discussed herein with reference to FIG. 4.

Generally, FIG. 5 illustrates that the method 406 may be iteratively executed to evaluate candidate spawning pairs in the input pairset. The loop control block 512 indicates that the method 406 is performed until the pairset is empty, unless another exit condition—see block 506—causes termination of processing when additional candidate spawning pairs remain in the pairset.

FIG. 5 illustrates that the method 406 begins at block 502 and proceeds to block 504. At block 504, initialization is performed. During such initialization 504, a default execution time for sequential execution of the input code sequence is established. A global execution time, which may be referred to herein as "t_exec", is set to this value. For at least one embodiment, such default execution time is set to the accumulated instruction length of the last basic block in the program trace 404 (see, for example, commit time 218, FIG. 2). In effect, the result of such initialization is that the global estimated execution time for the input code sequence is initialized to the estimated sequential execution of the input code sequence.

During execution of the method 406, one or more candidate spawning pairs from the input pairset 414 may be selected. Accordingly, during initialization 504 the set of "selected" spawning pairs is initialized to a null set.

From the initialization block 504, processing proceeds to block 506. At block 506, a modeling algorithm is utilized to determine if the effect of any of the candidate spawning pairs is anticipated to decrease the execution time for the input code sequence. In order to make this determination, a modeling algorithm is used to model the execution time of the input code sequence, taking into account the effect of concurrent execution of the speculative thread identified by one of the spawning pairs. A greedy algorithm is utilized to temporarily select the spawning pair if the modeling algorithm indicates that the spawning pair is expected to decrease the execution time. Such processing is discussed in further detail below in connection with FIG. 6.

Generally, at block 506 the method 406 will continue to evaluate other candidates in pairset, and will select a new candidate, and de-select the previously-selected candidate, if the new candidate is modeled to provide an even smaller execution time. Such processing continues at block 506 until all candidate spawning pairs in the pairset have been considered.

If, after all candidates in the pairset have been considered, no spawning pair has been temporarily selected at block 506 (i.e., "Select" indicator is null), then processing ends at block 514. In such case, none of the spawning pairs in the pairset identify a speculative thread that is expected to provide a performance benefit, in terms of reduced execution time, for the input code sequence.

Otherwise, if a candidate spawning pair has been temporarily selected at block 506 (i.e., "Select" indicator is not null), processing proceeds to block 508. At block 508, the temporarily selected spawning pair is added to the set of selected spawning pairs (which was initialized to a null set at the initialization block 504). Then, at block 510 the selected spawning pair is deleted from the pairset so that the pairset now includes a smaller set of spawning pairs to be considered in the next pass of block 506. It is determined at block 512 whether additional candidates remain in the pairset. If not, processing ends at block 514. Otherwise, processing loops back to block 506. In this manner, the processing of the method 406 is thus repeated until either the pairset is empty (see block 512), or none of the spawning pairs is predicted to provide any additional benefit (see block 506).

Regarding block 504, an optional optimization can be performed during initialization 504 for some embodiments in order to streamline the analysis of spawning pairs in the pairset. For such embodiments, only those spawning pairs that are expected to provide at least a minimal benefit are included as part of the pairset to be considered at block 506. Any spawning pairs that are not expected to provide at least a minimum benefit (in terms of reduced execution time for the input code sequence) are filtered out and are not considered during the block 506 processing described above. Such optimization is particularly useful for embodiments that do not restrict spawning pairs to high-level structures. Without such restriction, the number of possible spawning pairs can be quite large. Accordingly, compile time (for embodiments in which the method 400 is performed by a compiler) may be unacceptably long. Filtering may reduce the number of spawning pairs that are considered during the method 400, and may concomitantly reduce compilation time.

Various filter conditions may be imposed during initialization 504 in order to determine if a spawning pair should be excluded from consideration at block 506. Such filter conditions may include any or all the following:

A. Although the method 400 does not impose selection of spawning pairs from any particular high-level structure, such as loops or call continuations, a filter condition may be imposed such that a spawning pair is not considered if its spawn point and target point are not located in the same routine and at the same loop nest level.

B. A filter condition may be imposed to disregard spawning pairs for routines that represent a very small percentage of the total execution time. This information may be garnered from the edge profile (see, for example, 412, FIG. 4).

C. The Pair Length for a spawning pair (that is, the distance between the spawn point and the target point) may be measured in terms of the average number of dynamic instructions between the two points. A spawning pair may be disregarded if its average Pair Length is below a certain predetermined threshold length. For at least one embodiment, the predetermined threshold length may be determined based on the overhead (see 144, FIG. 1) associated with spawning a new thread.

D. A filter condition may be imposed to disregard a spawning pair if its pair probability is not above a predetermined threshold. Pair probability is a probability of reaching the target point from the spawn point, without revisiting the spawn point. Such filter may be utilized to disregard spawning pairs for which the speculative thread is not likely to be executed.

E. A filter condition may also be imposed to disregard a spawning pair if its pair weight is not above a certain threshold weight. Such filter may be utilized to disregard spawning pairs whose execution may not provide a significant impact. For such filter, the weight of a spawning pair may be defined as:

Pair weight=Routine weight*Pair reachability, where Routine weight is the percentage of dynamic instructions executed by a given routine (including called functions) with respect to the total dynamic instructions of the input program sequence. Pair reachability is a probability of reaching the SP from the beginning of the given routine.

F. Finally, a filter condition may be imposed such that a spawning pair is considered at block 506 only if the ratio of Slice Length: Pair Length is lower than a predefined threshold. For purposes of at least one embodiment of this filter, the Slice Length is the average number of dynamic instructions of the precomputation slice.

Figure 6:
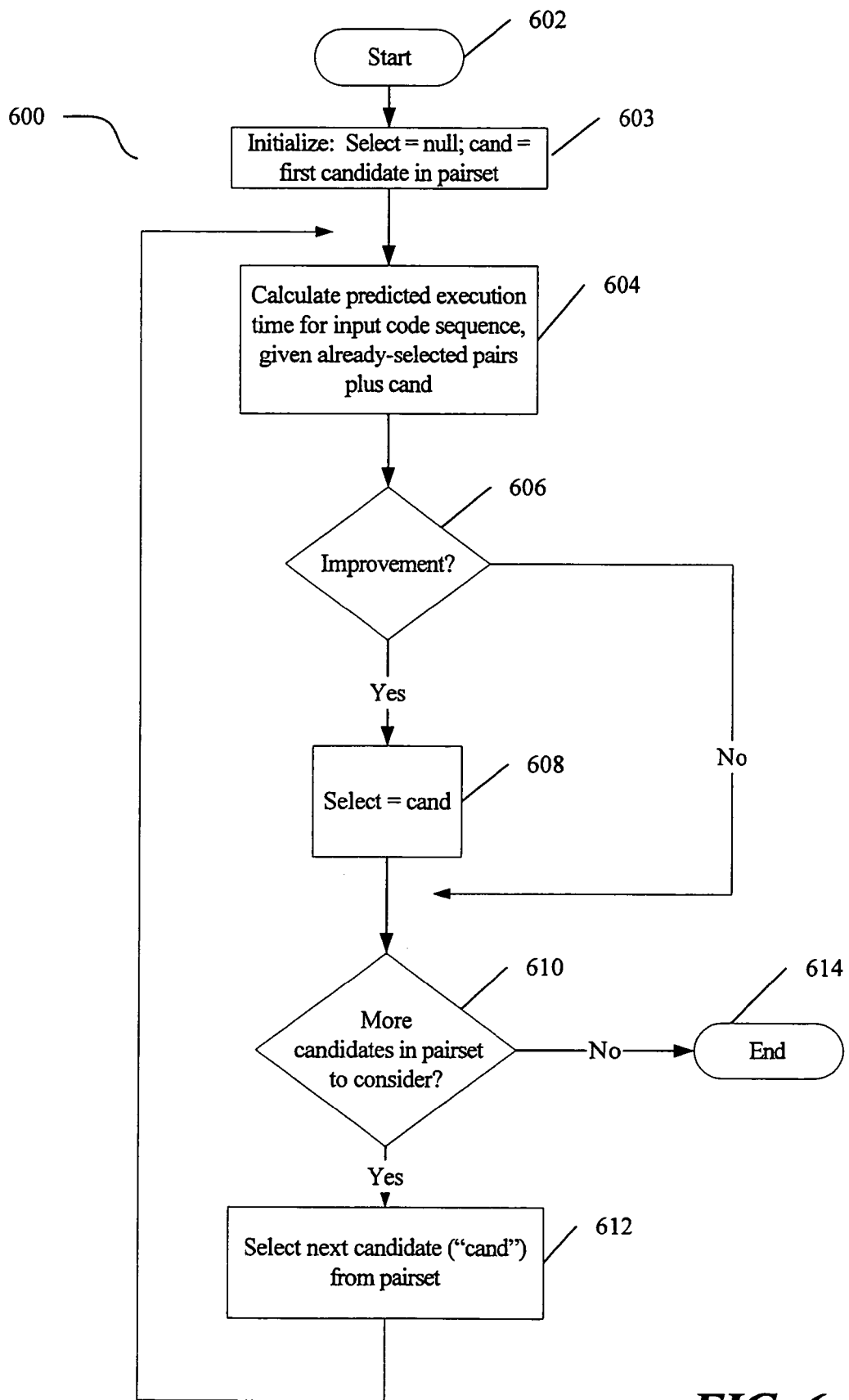
FIG. 6 is a flowchart illustrating at least one embodiment of a method for utilizing a greedy algorithm to select a spawning pair.

FIG. 6 is a flowchart illustrating further detail for at least one embodiment of method 600 for greedy selection of candidate spawning pairs that may be utilized at block 506 of FIG. 5. For at least one embodiment, a compiler may perform the method 600 illustrated in FIG. 6. For example, the method may be performed, for at least one embodiment, by an analyzer/selector 850 of a compiler 708 as illustrated in FIG. 8.

FIG. 6 illustrates that processing for the method 600 begins at block 602 and proceeds to block 603. At block 603, initialization is performed. Specifically, at least one initialization action taken at block 603 is to assign a temporary selection indicator, "Select" to a null value. Also, a candidate spawning pair in the pairset is selected to be the candidate ("cand") under consideration for the current iteration of the method 600. Processing then proceeds to block 604.

Block 604 is the first block in a group of blocks 604, 606, 608, 610, 612 that implement a greedy selection loop. At each iteration of the loop, a candidate spawning pair in the pairset is considered and its effect on the execution time of the input code sequence is analyzed.

At block 604, the estimated execution time for the input code sequence, t_exec_tmp, is calculated for the candidate spawning pair, "cand". The estimated execution time may be determined at block 606 by modeling the run-time behavior target processor as it executes the input code sequence, taking into account the multithreading effects of already-selected spawning pair(s), if any, along with the effects of the candidate spawning pair. Such expected execution time may be modeled for a given target SpMT processor. An example of at least one embodiment of a modeling method that can be utilized for this purpose is disclosed in the copending patent application bearing U.S. patent application Ser. No. 10/933, 076, entitled "Analyzer For Spawning Pairs In Speculative Multithreaded Processor," filed Sep. 1, 2004. An execution time modeler (such as, for example, 855 of FIG. 8) may be invoked to perform such calculation.

From block 604, processing proceeds to block 606. At block 606, it is determined whether the candidate spawning pair's estimated execution time, t_exec_tmp, indicates a performance benefit over the global execution time that takes into account only the spawning pairs (if any) in the "selected" set. Such evaluation may be made, for at least one embodiment, by determining whether t_exec_tmp is less than the global execution time, t_exec. If so, then processing proceeds to block 608. Otherwise, processing proceeds to block 610.

At block 608, the candidate spawning pair is temporarily selected, such that Select=cand. Processing then proceeds to block 610. At block 610, it is determined whether any additional candidates in the pairset remain to be considered. If so, processing proceeds to block 612. Otherwise, processing ends at block 614.

At block 612, "cand" is updated to reflect the next candidate spawning pair in the pairset. Processing then loops back to block 604.

In general, the discussion of FIGS. 4, 5 and 6, above, has presented one embodiment of a method 400 for analyzing and selecting one or more spawning pairs for inclusion in an otherwise single-threaded code sequence. After analysis and selection (see block 406 and method 600), the method 400 provides for adding a spawn instruction to the code sequence for each selected spawning pair (block 408), at the spawn point indicated by the spawning pair. The intended result is that a speculative thread be spawned at the spawn point during execution of the modified code sequence. When executed, each added spawn instruction causes a speculative thread to be spawned at the spawn and to begin execution. The spawn instruction may indicate either that the spawnee thread is to begin execution at a precomputation slice that calculates input live-in values for the speculative thread, or at the target point identified in the spawning pair corresponding to the spawn point.

The discussion above further indicates that the method 400 follows a greedy approach to selecting spawning pairs from the candidate pairset. Spawning pairs are selected from the pairset (block 610), added to a "selected" set of spawning pairs (block 508), and deleted from the pairset (block 510)t, until negligible additional benefit is expected from the remaining spawning pairs in the pairset or until the pairset is empty, whichever occurs first.

For at least one embodiment, the greedy algorithm is performed such that, among all candidate pairs remaining in the pairset, the new pair chosen (if any) to be included in the "selected" set is the one that is expected to provide (based on the modeling method described above) the best improvement in execution time among all the spawning pairs in the candidate pairset. Again, such benefit is computed using a model that estimates the execution behavior of a set of pairs for a given number of thread units.

The main loop for the method 400 exits when the expected execution time, taking any remaining candidate spawning pair into account, is not expected to provide significant improvement over the estimated execution that has been determined for the input code sequence that takes into account the effect of all other spawning pairs (if any) already in the "selected" set.

Embodiments of the methods discussed herein thus provide for determining the effect of a set of spawning pairs on the execution time for a sequence of program instructions for a particular multithreading processor and, further, for modifying an input program to include those speculative threads that are predicted to decrease execution time of the input code sequence. The input set of spawning pairs indicate potential concurrent speculative threads that may be spawned during execution of the sequence of program instructions and may thus reduce total execution time. The total execution time is determined by modeling the effects of speculative threads, which are indicated by the spawning pairs, on execution time for the sequence of program instructions.

Embodiments of the methods 400, 406, 600 disclosed herein may be implemented in hardware, software, firmware, or a combination of such implementation approaches. Embodiments of the invention may be implemented as computer programs executing on programmable systems comprising at least one processor, a data storage system (including volatile and non-volatile memory and/or storage elements), at least one input device, and at least one output device. Program code may be applied to input data to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The programs may be implemented in a high level procedural or object oriented programming language to communicate with a processing system. The programs may also be implemented in assembly or machine language, if desired. In fact, the method described herein is not limited in scope to any particular programming language. In any case, the language may be a compiled or interpreted language The programs may be stored on a storage media or device (e.g., hard disk drive, floppy disk drive, read only memory (ROM), CD-ROM device, flash memory device, digital versatile disk (DVD), or other storage device) readable by a general or special purpose programmable processing system. The instructions, accessible to a processor in a processing system, provide for configuring and operating the processing system when the storage media or device is read by the processing system to perform the procedures described herein. Embodiments of the invention may also be considered to be implemented as a machine-readable storage medium, configured for use with a processing system, where the storage medium so configured causes the processing system to operate in a specific and predefined manner to perform the functions described herein.

An example of one such type of processing system is shown in FIG. 7. System 700 may be employed, for example, to select spawn pairs for speculative multithreading. System 700 is representative of processing systems based on the Pentium®, Pentium® Pro, Pentium® II, Pentium® III, Pentium® 4, and Itanium® and Itanium® II microprocessors available from Intel Corporation, although other systems (including personal computers (PCs) having other microprocessors, engineering workstations, set-top boxes and the like) may also be used. In one embodiment, sample system 700 may be executing a version of the WINDOWS® operating system available from Microsoft Corporation, although other operating systems and graphical user interfaces, for example, may also be used.

FIG. 7 illustrates that a processing system 700 capable of performing disclosed techniques may include a memory system 750 and a processor 704. The processor 704 may be, for one embodiment, a processor 300 as described in connection with FIG. 3, above. Like elements for the processors 130000, 704 in FIGS. 3 and 7, respectively, bear like reference numerals.

Processor 704 includes N thread units 304*a*-304*n*, where each thread unit 304 may be (but is not required to be) associated with a separate core. For purposes of this disclosure, N may be any integer>1, including 2, 4 and 8. For at least one embodiment, the processor cores 304*a*-304*n* may share the memory system 750. The memory system 750 may include an off-chip memory 702 as well as a memory controller function provided by an off-chip interconnect 725. In addition, the memory system may include one or more caches (not shown).

Memory 702 may store instructions 740 and data 741 for controlling the operation of the processor 704. For example, instructions 740 may include a compiler program 708 that, when executed, causes the processor 704 to compile a program (not shown) that resides in the memory system 702. Memory 702 holds the program to be compiled, intermediate forms of the program, and a resulting compiled program. For at least one embodiment, the compiler program 708 includes instructions to model runtime execution of a sequence of program instructions, given a set of spawning pairs, for a particular multithreaded processor, and to select spawning pairs.

Memory 702 is intended as a generalized representation of memory and may include a variety of forms of memory, such as a hard drive, CD-ROM, random access memory (RAM), dynamic random access memory (DRAM), static random access memory (SRAM) and related circuitry. Memory 702 may store instructions 740 and/or data 741 represented by data signals that may be executed by processor 704. The instructions 740 and/or data 741 may include code for performing any or all of the techniques discussed herein. For example, at least one embodiment of a method for determining an execution time is related to the use of the compiler 708 in system 700 to cause the processor 704 to model execution time, given one or more spawning pairs, as described above. The compiler may thus, given the spawn instructions indicated by the spawning pairs, model a multithreaded execution time for the given sequence of program instructions and may select one or more of the spawning pairs.

Turning to FIG. 8, one can see an embodiment of a system 800 that includes a compiler 708 in memory system 750. The compiler 708 may include an analyzer/selector 850, a code modifier 860, and an execution time modeler 855. The analyzer/selector 850, when executed by the processor 704, may perform analysis and selection processing 406 as described above in connection with FIGS. 4, 5 and 6. The analyzer/selector 850 may, for example, model the spawning of one or more a speculative threads to execute a subset of the instructions represented by the input trace, and may elect those speculative thread(s), if any, that provide for decreased execution time.

The execution time modeler 855 may, when executed by the processor 704, perform at least one embodiment of a method for modeling execution time of a code sequence, taking into account the effect of one or more speculative threads. For at least one embodiment, the analyzer/selector 850 invokes the execution time modeler 855 to perform its processing. Again, further details for at least one embodiment of an example of a method that maybe performed by the execution time modeler 855 to model expected execution time may be found in the copending patent application bearing U.S. patent application Ser. No. 10/933,076, entitled "Analyzer For Spawning Pairs In Speculative Multithreaded Processor," filed Sep. 1, 2004.

FIG. 8 illustrates that the compiler 708 may also include a code modifier 860. The code modifier 860 may, when executed by a processor 704, cause the processor to generate a binary file (420, FIG. 4) for an input code sequence to include spawn instructions (and possible precomputation slice instructions) for those spawning pairs selected at block 406 of the method 400 illustrated in FIG. 4. Accordingly, the code modifier 860 may perform block 408 illustrated in FIG. 4 to generate a binary file (420, FIG. 4). The system 800 may execute binary files (420, FIG. 4) generated in accordance with at least one embodiment of the methods described herein.

FIG. 10 is a block data flow diagram illustrating data flow between an analyzer/selector 850 and an execution time modeler 855 of a compiler 708. One of skill in the art will recognize that FIG. 10 is intended to illustrate certain selected data, and should not be taken to be limiting—other data may certainly be communicated between the analyzer/selector 850 and an execution time modeler 855.

FIG. 10 illustrates that the execution time modeler 855 may receive as an input, from the analyzer/selector 850, a program trace or other representation of a sequence of program instructions to be evaluated (see, e.g., 404 of FIG. 4). The execution time modeler 855 may also receive as an input from the analyzer/selector 855 a pairset that identifies spawn instructions for potential speculative threads. For at least one embodiment, each spawn instruction is represented as a spawning pair that includes a spawn point identifier and a target point identifier. The pairset provided by the analyzer/selector 850 to the execution time modeler 855 may include the candidate spawning pair along with those spawning pairs that 1) have not been deleted responsive to application of optimization filters, and 2) have been previously selected as members of the set of "selected" spawning pairs.

FIG. 10 illustrates that the execution time modeler 855 may also receive as an input from the analyzer/selector 850 an indication of the number of thread units corresponding to a target processor. The analyzer/selector 850 receives back from the execution time modeler 855 an estimated execution time (t_exec_tmp).

While particular embodiments of the present invention have been shown and described, it will be obvious to those skilled in the art that changes and modifications can be made without departing from the present invention in its broader aspects. For example, the methods described herein may be utilized to generate a modified binary file when the input code is presented as an original binary file. For such embodiments, the methods described herein may be performed by a binary optimizer. The appended claims are to encompass within their scope all such changes and modifications that fall within the true scope of the present invention.

What is claimed is:

1. A method, comprising:

determining, for a target processor having a plurality of thread units, a predicted sequential execution time for a sequence of program instructions;

selecting a first speculative thread from a set of potential candidates, wherein the set of potential candidates further comprises a set of candidate spawning pairs, where each spawning pair indicates a spawn point and a target point for one of the candidates modeling a first predicted multithreaded execution time for the sequence of program instructions, wherein said modeling further includes modeling an effect of concurrent execution of the first speculative thread on the sequential execution time;

responsive to determining that the first predicted multithreaded execution time is less than the predicted sequential execution time, selecting the first speculative thread;

modeling a second predicted multithreaded execution time for the sequence of program instructions, the second predicted multithreaded execution time to include an effect of a second concurrent speculative thread on the sequential execution time;

selecting the second speculative thread, and de-selecting the first speculative thread, if the second predicted multithreaded execution time is less than the first predicted multithreaded execution time; and generating a binary file corresponding to the sequence of program instructions, where the binary file includes a spawn instruction for the selected speculative thread.

2. The method of claim 1, wherein generating the binary file further comprises:

generating the binary file to include a precomputation slice for the speculative thread.

3. The method of claim 1, wherein said modeling further comprises:

modeling the expected run-time behavior of the target processor for execution of the sequence of program instructions by a main thread and said concurrent speculative thread.

4. An article, comprising:

a machine-accessible storage medium having a plurality of machine accessible instructions; wherein, when the instructions are executed by a processor, the instructions provide for:

determining, for a target processor having a plurality of thread units, a predicted sequential execution time for a sequence of program instructions;

selecting a first speculative thread from a set of potential candidates, wherein the set of potential candidates further comprises a set of candidate spawning pairs, where each spawning pair indicates a spawn point and a target point for one of the candidates modeling a first predicted multithreaded execution time for the sequence of program instructions, wherein said modeling further includes modeling an effect of concurrent execution of the first speculative thread on the sequential execution time;

responsive to determining that the first predicted multithreaded execution time is less than the predicted sequential execution time, selecting the first speculative thread;

modeling a second predicted multithreaded execution time for the sequence of program instructions, the second predicted multithreaded execution time to include an effect of a second concurrent speculative thread on the sequential execution time;

selecting the second speculative thread, and de-selecting the first speculative thread, if the second predicted multithreaded execution time is less than the first predicted multithreaded execution time; and generating a binary file corresponding to the sequence of program instructions, where the binary file includes a spawn instruction for the selected speculative thread.

5. The article of claim 4 wherein instructions that provide for generating the binary file further comprise:

instructions that provide for generating the binary file to include a precomputation slice for the speculative thread.

6. The article of claim 4, wherein the instructions that provide for modeling further comprise:

instructions that provide for modeling the expected runtime behavior of the target processor for execution of the sequence of program instructions by a main thread and said concurrent speculative thread.

7. A system, comprising:

a memory;

a processor communicably coupled to the memory, wherein the processor comprises a plurality of thread units; and a compiler residing in said memory, said compiler to:

select a first speculative thread from a set of potential candidates, wherein the set of potential candidates further comprises a set of candidate spawning pairs, where each spawning pair indicates a spawn point and a target point for one of the candidates;

determine, for a target processor having a plurality of thread units, a predicted sequential execution time for a sequence of program instructions based on modeling a predicted multithreaded execution time for the sequence of program instructions, wherein said modeling further includes modeling an effect of concurrent execution of the first speculative thread on the sequential execution time;

select, responsive to determining that the predicted multithreaded execution time is less than the predicted sequential execution time, the first speculative thread:

model a second predicted multithreaded execution time for the sequence of program instructions, the second predicted multithreaded execution time to include an effect of a second concurrent speculative thread on the sequential execution time;

select the second speculative thread, and de-select the first speculative thread, if the second predicted multithreaded execution time is less than the predicted multithreaded execution time; and generate a binary file corresponding to the sequence of program instructions, where the binary file includes a spawn instruction for the selected speculative thread.

8. The system of claim 7, wherein:

the compiler is further to model a plurality of predicted multithreaded execution times, each for a distinct one of a plurality of potential speculative threads.

9. The system of claim 8, wherein:

the compiler is further to utilize a greedy algorithm to determine whether to select one or more of the plurality of potential speculative threads.

10. The system of claim 9, wherein:

the compiler is further to modify a binary file to include a spawn instruction for each of a plurality of selected potential speculative threads.

11. The system of claim 7, wherein:

the compiler is further to modify a binary file to include a spawn instruction for the speculative thread.

12. The system of claim 7, wherein:

the compiler is further to modify the binary file to include a copy of a subset of instructions from the binary file, wherein said subset is to determine an input value for the speculative thread.

13. The system of claim 12, wherein:

the compiler is further to generate a spawn instruction that it indicates the first of the subset of instructions as its target address.

14. The system of claim 12, wherein:

the compiler is further to add a branch instruction to the subset, wherein the branch instruction indicates a target address for the speculative thread.

15. A compiler comprising a plurality of machine accessible instructions stored on a machine-accessible storage medium, the plurality of instructions further comprising:

an analyzer/selector to select a first speculative thread from a set of potential candidates, wherein the set of potential candidates further comprises a set of candidate spawning pairs, where each spawning pair indicates a spawn point and a target point for one of the candidates;

an execution time modeler to model concurrent execution, on a target processor, of a main thread and the first speculative thread to calculate a parallel execution time, wherein the first speculative thread includes a subset of the instructions in a code sequence associated with the main thread;

an analyzer to determine whether the calculated parallel execution time is less than an estimated sequential execution time for the main thread;

the execution time modeler further to model a second concurrent execution, the second concurrent execution to include a second concurrent speculative thread to calculate a second parallel execution time;

the analyzer/selector further to select the second speculative thread, and de-select the first speculative thread, responsive to determining that the second parallel execution time is less than the estimated sequential execution time; and a code modifier to modify a binary file for the main thread to include a spawn instruction for the selected speculative thread.

16. The compiler of claim 15, wherein:

said execution time modeler is further to model concurrent execution, on the target processor, of the main thread, the speculative thread, and at least one additional speculative thread to calculate a third parallel execution time.

17. The compiler of claim 16, wherein said analyzer/selector is further to:

select the speculative thread if the third parallel execution time is less than the parallel execution time.

18. The compiler of claim 15, wherein:

the code modifier is further to modify the binary file to include a precomputation slice for the selected speculative thread.

19. The compiler of claim 15, wherein:

the selected speculative thread is associated with a spawn point and a target point; and:

the code modifier is further to modify the binary file such that spawn instruction indicates that the selected speculative thread should begin execution at the target point.

20. The compiler of claim 18, wherein:
the selected speculative thread is associated with a spawn point and a target point; and
the code modifier is further to modify the binary file such that spawn instruction indicates that the selected speculative thread should begin execution at the precomputation slice.

21. The compiler of claim 20, wherein:
the code modifier is further to modify the binary file with an instruction to cause the selected speculative thread to begin execution at the target point after execution of the precomputation slice.

22. The compiler of claim 15, wherein:
the selected speculative thread is associated with a spawn point and a target point; and:
the code modifier is further to modify the binary file to place the spawn instruction at the spawn point.

23. The system of claim 7, wherein:
the memory is a DRAM.

24. The method of claim 1, further comprising:
a. designating the second predicted multithreaded execution time as the current predicted multithreaded execution time;

b. modeling an additional predicted multithreaded execution time tor the sequence of program instructions, the additional predicted multithreaded execution time to include the effect of an additional concurrent speculative thread on the sequential execution time; and c. selecting the additional speculative thread, de-selecting a previously-selected speculative thread, and designating the additional predicted multithreaded execution time as the current predicted multithreaded execution time if the additional predicted multithreaded execution time is less that the current predicted multithreaded execution time; and repeating b. and c. until the additional predicted multithreaded execution time is not less than the predicted multithreaded execution time.

25. The compiler of claim 15 wherein:

the execution time modeler is further to calculate a plurality of parallel execution times based on a plurality of speculative threads; and the analyzer/selector is to perform a greedy algorithm to select one or more speculative threads based on the plurality of execution times.

* * * * *